United States Patent
Baillard

(10) Patent No.: US 8,534,597 B2
(45) Date of Patent: Sep. 17, 2013

(54) PROPULSION ASSEMBLY FOR AIRCRAFT

(75) Inventor: Andre Baillard, Bretteville du Grand Caux (FR)

(73) Assignee: Aircelle, Gonfreville l'Orcher (FR)

( * ) Notice: Subject to any disclaimer, the term of this patent is extended or adjusted under 35 U.S.C. 154(b) by 660 days.

(21) Appl. No.: 12/681,662

(22) PCT Filed: Aug. 28, 2008

(86) PCT No.: PCT/FR2008/001209
§ 371 (c)(1),
(2), (4) Date: Apr. 5, 2010

(87) PCT Pub. No.: WO2009/060138
PCT Pub. Date: May 14, 2009

(65) Prior Publication Data
US 2010/0206981 A1    Aug. 19, 2010

(30) Foreign Application Priority Data
Oct. 5, 2007  (FR) .................................. 07 07000

(51) Int. Cl.
*B64D 27/10*   (2006.01)
(52) U.S. Cl.
USPC ............................... 244/54; 248/554; 60/796
(58) Field of Classification Search
USPC .......... 244/54, 123.4; 248/554–557; 60/796, 60/797
See application file for complete search history.

(56) References Cited

U.S. PATENT DOCUMENTS

| 4,458,863 A | * | 7/1984 | Smith | 244/54 |
| 6,843,449 B1 | | 1/2005 | Manteiga | |

FOREIGN PATENT DOCUMENTS

| EP | 0147878 | 7/1985 |
| EP | 1571081 | 9/2005 |
| GB | 1504290 | 3/1978 |

OTHER PUBLICATIONS

International Search Report; PCT/FR2008/001209; May 25, 2009.

\* cited by examiner

*Primary Examiner* — Timothy D Collins
*Assistant Examiner* — Nicholas McFall
(74) *Attorney, Agent, or Firm* — Brinks Hofer Gilson & Lione

(57) ABSTRACT

The invention relates to a propulsion assembly for an aircraft, that comprises: a turbojet engine (1) including a fan casing (3) and an engine casing (5); a pylon for holding said turbojet engine (1); and a device for suspending said turbojet engine under the pylon, that comprises two front suspension connecting rods (9), two rear suspension connecting rods (11), and a thrust acceleration connecting rod (15) extending between the front portion (17) of said engine casing (5) and the pylon in a plane containing the axis (A) of said turbojet engine (1). An additional connecting rod (19) extends between said fan casing (3) and said pylon in a direction substantially parallel to that of the axis (A) of said turbojet engine.

7 Claims, 3 Drawing Sheets

PROPULSION ASSEMBLY FOR AIRCRAFT

TECHNICAL FIELD

The present invention relates to a propulsion assembly for an aircraft.

BACKGROUND

The related art (shown by example in FIG. 1 appended hereto) informs of a propulsion assembly for an aircraft comprising:
- a turbojet engine 1 comprising a fan casing 3 and an engine casing 5,
- a pylon 7 for supporting this turbojet engine, and
- a device for suspending this turbojet engine beneath this pylon 7 comprising front suspension connecting rods 9 extending between said fan casing 3 and said pylon 7 in a plane substantially perpendicular to the axis A of said turbojet engine 1, rear suspension connecting rods 11 extending between the rear portion 13 of said engine casing 5 and said pylon 7 in a plane substantially perpendicular to the axis A of said turbojet engine, and a thrust-absorbing connecting rod 15 extending between the front portion 17 of said engine casing 5 and said pylon 7 in a plane comprising the axis A of said turbojet engine.

In this system, the main forces generated by the turbojet engine in normal operation are, on the one hand, the thrust force F (see FIG. 2) and, on the other hand, the aerodynamic force applied to the air intake (not shown) situated in front of the fan casing 3, this aerodynamic force generating a moment M represented in FIG. 1 at the center of gravity G of the turbojet engine.

The reaction forces making it possible to balance the thrust force F and the moment M are mainly: a reaction force R1 applied by the front suspension connecting rods 9 to the fan casing 3 and directed downward, a reaction force R2, applied by the rear suspension connecting rods 11 to the rear portion 13 of the engine casing 5, and a reaction force R3, applied by the thrust-absorbing connecting rod 15 to the front portion 17 of the engine casing 5.

The force R2 applied to the rear portion 13 of the engine casing 5 passes through the rear portion of the turbojet engine in the form of shearing forces, which tends to deform the engine shaft and thus adversely affect the performance of this engine, and notably its consumption.

BRIEF SUMMARY

The invention provides a propulsion assembly for an aircraft, comprising:
- a turbojet engine comprising a fan casing and an engine casing,
- a pylon for supporting this turbojet engine, and
- a device for suspending this turbojet engine beneath this pylon comprising front suspension connecting rods extending between said fan casing and said pylon in a plane substantially perpendicular to the axis of said turbojet engine, rear suspension connecting rods extending between the rear portion of said engine casing and said pylon in a plane substantially perpendicular to the axis of said turbojet engine, and a thrust-absorbing connecting rod extending between the front portion of said engine casing and said pylon in a plane comprising the axis of said turbojet engine, noteworthy in that said suspension device also comprises an additional connecting rod extending between said fan casing and said pylon in a direction substantially parallel to that of the axis of said turbojet engine.

The presence of this additional connecting rod makes it possible to transfer toward the front of the turbojet engine, that is to say in the zone of the fan casing and of the front of the engine casing, most of the reaction forces applied by the suspension device to the turbojet engine.

In this way the reaction forces transmitted by the rear suspension connecting rods are reduced, which makes it possible to remove the risk of deformation of the engine shaft.

According to other optional features of the propulsion assembly according to the invention:
- all said connecting rods are connected by swivel joints to their respective members: this makes it possible to obtain an isostatic suspension of the turbojet engine, that is to say a suspension that is just sufficient to block all the degrees of freedom (translations in the three directions of space and rotations about these three directions) of the turbojet engine relative to the pylon. The value of such an isostatic connection is, on the one hand, that it makes it possible to ascertain with certainty the nature (directions and intensities) of the forces passing through each connecting rod, thus allowing a perfectly appropriate dimensioning of these connecting rods, and, on the other hand, that it creates no stress due to thermal expansion;
- the directions of said front suspension connecting rods are substantially radial relative to the axis of said turbojet engine;
- said front suspension connecting rods are placed in a manner that is substantially symmetrical relative to a substantially vertical plane containing the axis of said turbojet engine;
- the directions of said rear suspension connecting rods are substantially parallel with one another;
- the direction of one of said rear suspension connecting rods is substantially radial relative to the axis of said turbojet engine;
- the direction of said rear suspension connecting rods is inclined relative to the vertical;
- at least one of said thrust-absorbing connecting rod and additional connecting rod is inclined relative to the axis of said turbojet engine.

The directions of each of the suspension connecting rods according to the invention are exactly determined by computing tools which those skilled in the art usually have for dimensioning their structures, the objective in this instance being to ensure a good distribution of the forces between all the connecting rods.

BRIEF DESCRIPTION OF THE DRAWINGS

Other features and advantages of the present invention will appear in the light of the following description and on examination of the appended figures, in which.

DETAILED DESCRIPTION

In all of these figures, identical reference numbers designate identical or similar members or sets of members.

Figure 3:
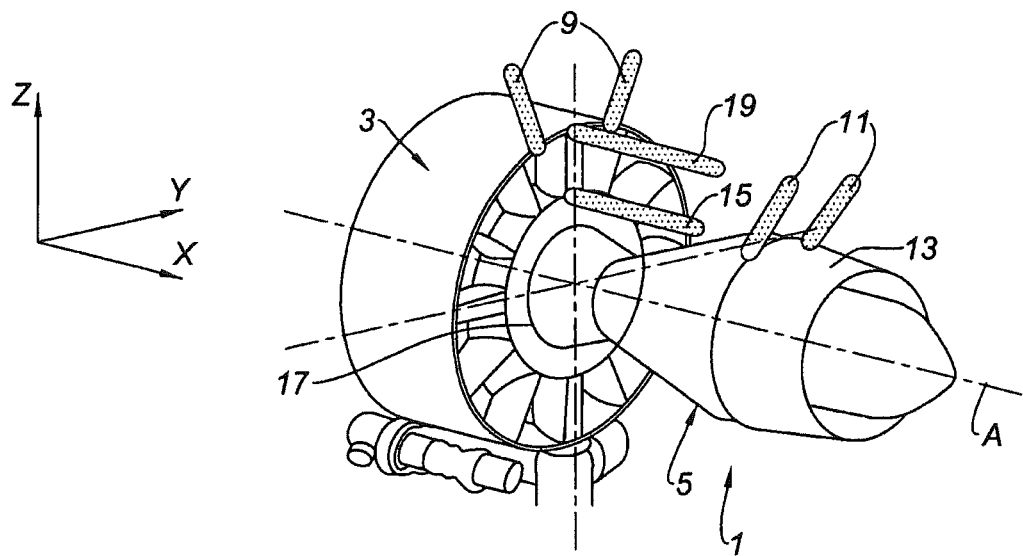
FIG. 3 represents schematically and in perspective a propulsion assembly according to the invention.
Figure 4:
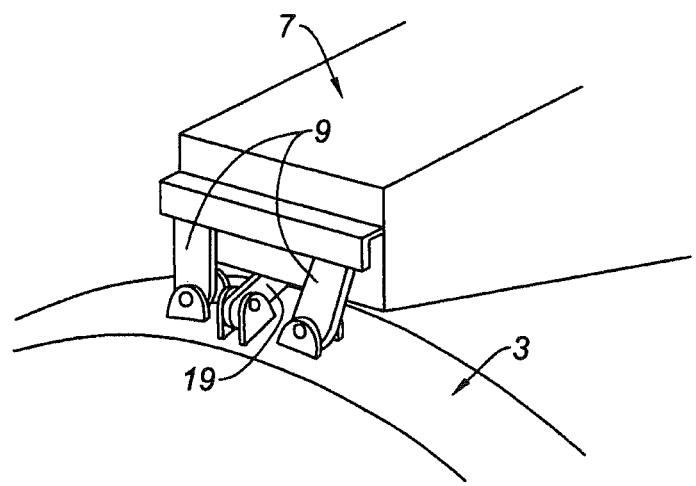
FIG. 4 is a partial view in perspective of the propulsion assembly of FIG. 3 showing the zone at which the pylon of this propulsion assembly is attached to the fan casing of a turbojet engine, FIG. 5, similar to FIG. 2, represents schematically a propulsion assembly according to the invention, with the forces in play.

With reference to FIGS. 3 and 4, it can be seen that the propulsion assembly according to the invention comprises a front suspension formed by two connecting rods 9 interposed between the fan casing 3 and the pylon 7, a rear suspension formed by two connecting rods 11 interposed between the rear portion 13 of the engine casing 5 and the pylon 7, a thrust-force-absorbing connecting rod 15 interposed between the front portion 17 of the engine casing 5 and the pylon 7.

The propulsion assembly according to the invention also comprises an additional connecting rod 19 interposed between the fan casing 3 and the pylon 7, and extending in a direction substantially parallel to that of the axis A of the engine.

As can be seen in FIG. 4, this additional connecting rod 19 is attached to the fan casing 3 between the two front suspension connecting rods 9.

All of the abovementioned connecting rods are connected to their respective members (fan casing 3, engine casing 5 and pylon 7) by swivel-joint connections, that is to say having three degrees of freedom.

In this way, an isostatic connection is obtained between the pylon 7 and the turbojet engine 1, making it possible to ascertain with precision the nature (intensity and direction) of the forces transmitted by these connecting rods.

FIG. 3 shows a direct trihedron X Y Z representing the three directions in space that are necessary for the explanations that follow.

The direction X of this trihedron is parallel to the axis A of the engine, the direction Y of this trihedron is perpendicular to the axis of this engine and horizontal, and the direction Z of this trihedron is perpendicular to the axis A of the turbojet engine and vertical.

Figure 5:
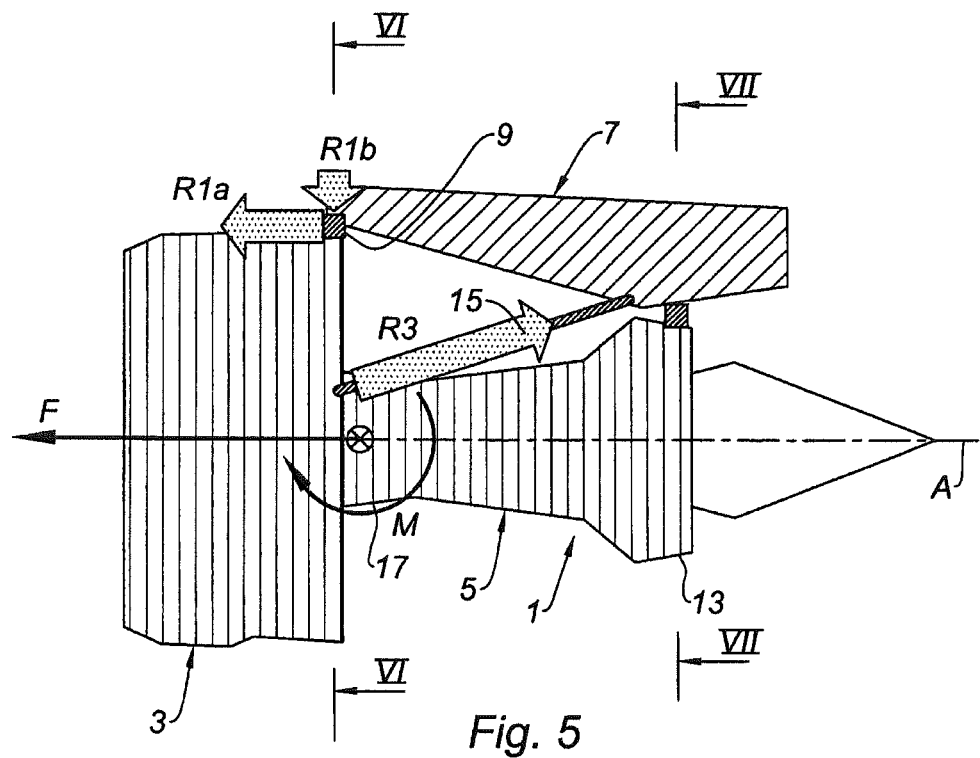

As indicated in the preamble of the present description, the main forces generated by the turbojet engine 1 relative to the pylon 7 in normal operation are, on the one hand, a thrust force F oriented toward the front of the turbojet engine in the direction X (see FIG. 5) and, on the other hand, a moment M oriented in the clockwise direction of rotation about the axis Y.

In reaction to these forces, the pylon 7 applies to the fan casing 3, via the additional connecting rod 19, a force R1$a$ oriented substantially in the direction X, toward the front of the turbojet engine 1.

The pylon 7 also applies to the casing 3, via the two connecting rods 9, a reaction force R1$b$ oriented in the vertical direction Z, toward the bottom of the turbojet engine 1.

The pylon 7 also applies to the front portion 17 of the engine casing 5, via the thrust-absorbing connecting rod 15, a reaction force R3 largely opposing the thrust force F.

The reaction forces transmitted by the connecting rods 11 of the rear suspension are markedly less than those of a previous propulsion assembly.

The additional connecting rod 19 specifically makes it possible to absorb the majority of the forces generated by the moment M, the connecting rods 11 for their part having to absorb only the forces originating from the rotation of the engine, and the lateral movements of the engine (moments about the axes X and Z, and force oriented in the direction Y).

Figure 1:
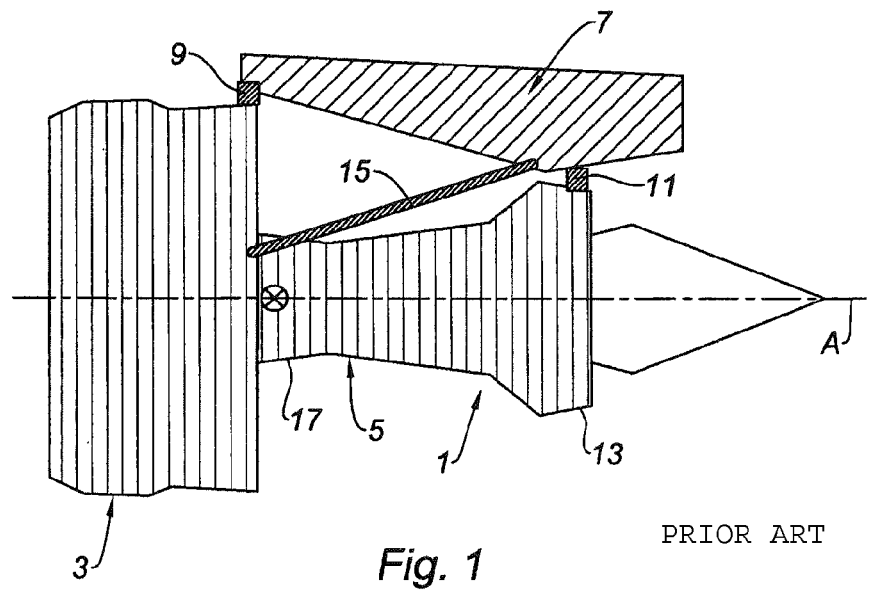
FIGS. 1 and 2 represent schematically and in side view a propulsion assembly mentioned in the preamble of the present description.
Figure 2:
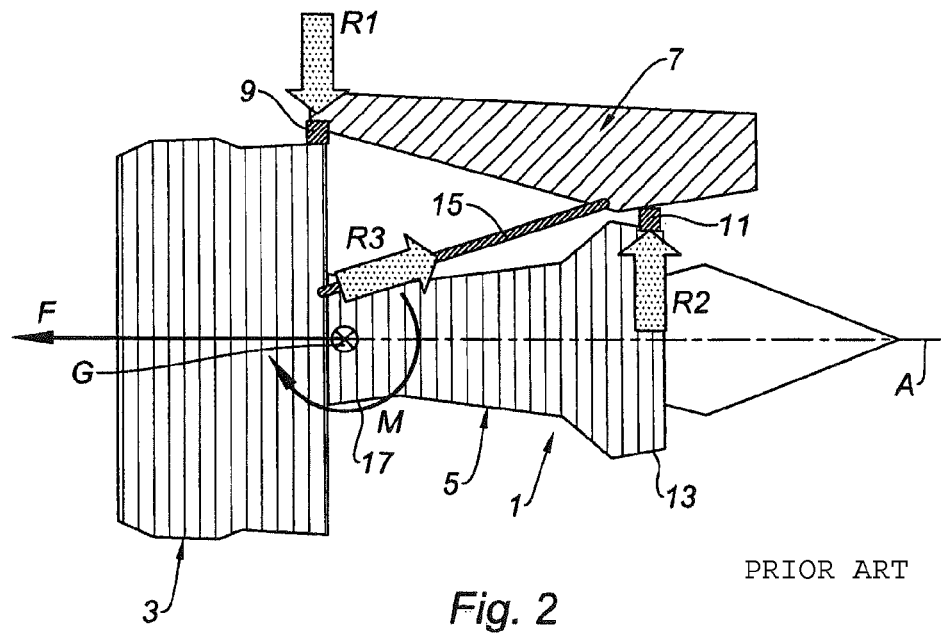

The connecting rods 11 of the rear suspension therefore no longer have to sustain the considerable vertical reaction force R2 that is present in a device FIG. 2, generated by the moment M of rotation of the turbojet engine about the axis Y.

As can therefore be understood, the invention makes it possible to transfer into the zone of the fan casing 3 and of the front 17 of the engine casing 5 the majority of the reaction forces applied by the suspension device to the turbojet engine 1; this thereby relieves the rear 13 of the engine casing 5 of considerable forces capable of leading to a deformation of the engine shaft of the turbojet engine.

Figure 6:
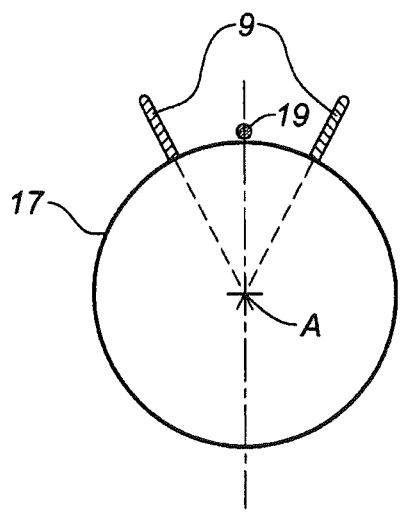
FIG. 6 is a schematic view in section on the line VI-VI of the propulsion assembly of FIG. 5.

Computer simulations have shown that, because of all the forces coming into play (force in the three directions X Y and Z, and moments about these three directions), a symmetrical and substantially radial arrangement (that is to say the notional extension is bisected in the vicinity of the axis A of the turbojet engine 1, as shown in FIG. 6) of the two front suspension connecting rods 9, making it possible to obtain an optimization of the distribution of the forces between these connecting rods.

Figure 7:
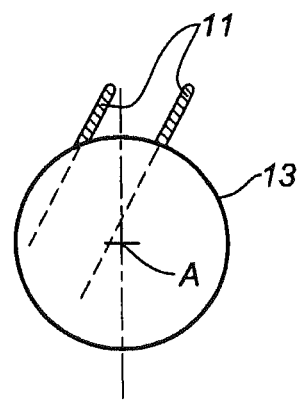
FIG. 7 is a schematic view in section on the line VII-VII of the propulsion assembly of FIG. 5.

Similarly, the arrangement of the two connecting rods 11 of the rear suspension as shown in FIG. 7 is particularly advantageous.

In this arrangement, the two connecting rods 11 are parallel with one another and inclined relative to the vertical, one of these connecting rods having a substantially radial orientation.

It appears that this particular arrangement of the connecting rods 11 produces a good compromise between a good resistance to the moments of the engine torque (about the axis X) and a satisfactory stability with respect to the lateral forces (direction Y).

It should be noted that the inclination of the connecting rod 15 relative to the axis of the turbojet engine 1 can vary typically in a range from 0° to 20°, depending on the situations encountered (geometry and weight of the pylon and of the turbojet engine, stresses to be taken into account, etc.).

It has been possible to ascertain that the suspension according to the invention has great robustness with respect to the variations of inclination of the connecting rods that form it.

Therefore, for example, an angle variation of 20° in the thrust-absorbing connecting rod 15 causes an increase of only 5% in the forces absorbed by this connecting rod.

An angular variation of a few degrees about the radial direction for each of the connecting rods 9 of the front suspension is not critical, and makes it possible to optimize the distribution of forces in the connecting rods 11 of the rear suspension with respect to the lateral forces, that is to say oriented in the direction Y.

A slight angular dissymmetry of the two connecting rods 9 forming the front suspension is acceptable.

An angular variation of a few degrees for the two connecting rods 11 of the rear suspension does not change the distribution of forces very much.

Naturally, the present invention is in no way limited to the embodiment described and shown, which is supplied simply as an example.

The invention claimed is:

1. A propulsion assembly for an aircraft, comprising:
a turbojet engine comprising a fan casing and an engine casing;
a pylon for supporting the turbojet engine; and
a device for suspending the turbojet engine beneath the pylon comprising:

front suspension connecting rods extending between said fan casing and said pylon in a plane substantially perpendicular to an axis of said turbojet engine, rear suspension connecting rods extending between a rear portion of said engine casing and said pylon in a plane substantially perpendicular to the axis of said turbojet engine, said rear suspension connecting rods being substantially parallel with one another a thrust-absorbing connecting rod extending between a front portion of said engine casing and said pylon in a plane comprising the axis of said turbojet engine, and an additional connecting rod extending between said fan casing and said pylon in a direction substantially parallel to that of the axis of said turbojet engine.

2. The propulsion assembly as claimed in claim 1, wherein all said connecting rods are connected by swivel joints to their respective members.

3. The propulsion assembly as claimed in claim 1, wherein directions of said front suspension connecting rods are substantially radial relative to the axis of said turbojet engine.

4. The propulsion assembly as claimed in claim 1, wherein said front suspension connecting rods are placed in a manner that is substantially symmetrical relative to a substantially vertical plane containing the axis of said turbojet engine.

5. The propulsion assembly as claimed in claim 1, wherein a direction of one of said rear suspension connecting rods is substantially radial relative to the axis of said turbojet engine.

6. The propulsion assembly as claimed in claim 1, wherein a direction of said rear suspension connecting rods is inclined relative to the vertical.

7. The propulsion assembly as claimed in claim 1, wherein said thrust-absorbing connecting rod is inclined relative to the axis of said turbojet engine.

* * * * *